United States Patent [19]
Wells

[11] 3,708,866
[45] Jan. 9, 1973

[54] THIN FILM DIFFUSION BRAZING OF NICKEL AND NICKEL BASE ALLOYS

[75] Inventor: Robert R. Wells, La Mirada, Calif.

[73] Assignee: Northrop Corporation, Beverly Hills, Calif.

[22] Filed: Nov. 25, 1968

[21] Appl. No.: 778,802

[52] U.S. Cl. .................................29/498, 29/504
[51] Int. Cl. ....................B23k 31/02, B23k 35/24
[58] Field of Search........29/198, 498, 501, 504, 503, 29/502

[56] References Cited

UNITED STATES PATENTS

| | | | |
|---|---|---|---|
| 2,857,663 | 10/1958 | Beggs | 29/498 X |
| 2,906,008 | 9/1959 | Boegehold et al. | 29/501 X |
| 3,015,885 | 1/1962 | McEuen et al. | 29/504 X |
| 3,057,048 | 10/1962 | Hirakis | 29/198 UX |
| 3,395,993 | 8/1968 | Bristow | 29/198 X |
| 3,417,461 | 12/1968 | Wells et al. | 29/501 X |
| 3,510,280 | 5/1970 | Hagadorn et al. | 29/198 X |

Primary Examiner—J. Spencer Overholser
Assistant Examiner—Ronald J. Shore
Attorney—Sokolski & Wohlgemuth

[57] ABSTRACT

A method for joining nickel and nickel base alloys comprising disposing a thin film of a metal selected from a class consisting of titanium and niobium (or columbium) between the surfaces to be joined, pressing the surfaces together whereby the film forms an intermediate layer, heating to a eutectic temperature and holding the surfaces at such temperature for a period of time to allow sufficient diffusion of the nickel into the intermediate layer, the formation of a liquid in the intermediate layer and a return to a solid state diffusion between intermediate layer and nickel.

8 Claims, No Drawings

THIN FILM DIFFUSION BRAZING OF NICKEL AND NICKEL BASE ALLOYS

Nickel and nickel base alloys have become increasingly more important in today's advanced technology. As a result, many braze alloy systems have been developed and utilized in the fabrication of components of nickel and nickel alloys. However, to date all of the presently developed braze alloy systems have had various deficiencies. Gold base braze alloys are used on nickel, however their high cost prevents their use in many applications. Nickel base brazing alloys have the problems of brittleness and erosiveness while many other braze alloy systems have lacked oxidation resistance. Another disadvantage of several of the currently existing braze systems is that they can only be prepared in the powder form. Problems of powder placement and powder purity become quite noticeable with these types of braze systems.

Thus it is an object of this invention to provide a method for brazing nickel and nickel base alloys utilizing a thin film of brazing material.

Another object of this invention is to provide a method for brazing nickel and nickel base alloys wherein a strong joint is obtainable.

A further object of this invention is to provide a method for brazing nickel and nickel base alloys which will provide oxidization resistance in the brazed area.

Still one further object of this invention is to provide a method for brazing nickel and nickel base alloys which can be easily utilized in brazing honeycomb material to thin sheets.

The above and other objects of this invention are accomplished by a thin-film diffusion brazing concept which forms joints in a process that combines solid state diffusion with the formation of a liquid that is accompanied by conventional wetting and flowing action as in normal brazing. In the discussion of this invention, the term nickel components will refer to both nickel and nickel base alloy materials. Briefly, the herein method involves a solid state diffusion between nickel and either titanium or niobium at elevated temperatures. After sufficient diffusion occurs, a liquid comprised of the nickel and titanium or nickel and niobium is formed and diffusion occurs rapidly. The eutectic composition liquid is rapidly formed and wetting in full takes place along the nickel surface. Further diffusion of nickel into the liquid joint region causes solidification of the joint and eventually additional solid state diffusion results in the formation of a joint composition that has the desired properties of the final product.

It is believed that the invention will be further understood from the following detailed description and specific examples:

In developing the method of this invention, various criteria were set forth to obtain an optimum braze system. Firstly, the material in the braze system must be compatible with the nickel being brazed. Next, upon the formation of a liquid in the braze joint, it must not deeply penetrate the nickel grain boundaries causing a poor joint, and it must not excessively erode the nickel material. Further, the intermediate braze system should not form excessive quantities of brittle compounds or continuous interface layer of brittle compounds. Finally, the reaction between the intermediate or braze system and the nickel should take place at a temperature low enough to prevent or limit the incipient melting of the nickel-base braze alloys. After extensive investigation it was found that the utilization of thin films of either niobium or titanium provided brazing systems that met the aforegoing requirements.

Each of the two systems, namely, thin films of titanium and niobium will be discussed independently since the temperatures required to achieve the eutectic compositions vary. However, it will be apparent that the same theory and method of utilizing these materials applies to both. The first material that will be discussed is niobium. In brazing nickel surfaces together, a thin film or foil of pure niobium is utilized. This is achieved by placing such a thin foil of the niobium between the surfaces to be joined or, alternatively, depositing a thin film of the niobium on one of the surfaces to be joined by conventional vapor deposition or vacuum deposition techniques. Niobium and nickel form a eutectic at 1,175° C, as seen in the phase diagram of the nickel niobium system shown on Page 1,011 of Constitution of Binary Alloys, Max Hansen, McGraw-Hill Book Co., 1958. The eutectic temperature will vary, however, depending upon the particular nickel alloy utilized. However, in the course of this invention it was found that in order to obtain a satisfactory eutectic liquid formation between pure nickel and pure niobium foil a temperature of 1,220° C was required. Utilizing the pure nickel, it was noticed that a eutectic liquid did start to form at temperatures as low as 1,175° C. However, at the higher temperature of around 1,220° C, better wetting and flow was achieved.

When heating to a temperature in the range of 1,175° to 1,220° C, there will first occur a solid state diffusion between the nickel component and the niobium, over a period of time. As the composition in the intermediate layer reaches approximately 60 weight percent niobium and 40 weight percent nickel, a liquid plus solid region is formed. The diffusion rate increases in the liquid and the composition quickly approaches that of the eutectic liquid. This eutectic composition is approximately 51.6 weight percent niobium. This eutectic liquid wets and flows along the nickel components as a brazing alloy. As the joint is held at the brazing temperature further nickel pick up occurs in the liquid, which causes the composition to change again forming a liquid plus a solid region. With further passage of time at the same temperature, complete solidification occurs and all further composition changes then occur by further solid state diffusion. Eventually, the joint or the intermediate layer reaches a composition of less than 30 weight percent niobium.

One can achieve effective joints by keeping the joint at the given temperature for a sufficient period of time where its composition can be reduced to as little as 1 percent niobium. However, generally this is not practical or needed. From 30 weight percent niobium down to about 10 weight percent niobium at a temperature of 1,220° C, the joint is a two-phase system of a solid solution of Ni and Nb plus NbNi$_3$. As the joint becomes less than 10 weight percent niobium it is merely comprised of a solid solution of nickel and niobium. Generally this latter form of joint material is preferred. As a result, it is most desirable, but not a requirement, to maintain the heating temperature until the composition of the joint reaches less than 10 weight percent niobium.

It should be apparent from the foregoing discussion that it is not often necessary to heat the joint to high temperatures in order to achieve the brazing unless very short diffusion times are desired. As a result, it is usually preferred that the brazing temperature not exceed 1,220° C, where satisfactory results are obtained. However, the joint can be heated much higher with some nickel base alloys as long as the base alloy does not melt with satisfactory results. The minimum brazing temperature appears to be 1,175° C. After the joint is heated for a sufficient period of time to achieve the desired end composition in the intermediate layer, the material is cooled. In order to achieve sufficient diffusion, the two nickel surfaces need only be pressed together with the intermediate foil at a pressure sufficient to maintain contact. In other words, no extreme pressure conditions are required.

Based on thin film diffusion equations it is known that as the amount of intermediate material doubles, it takes four times as long to diffuse to a given joint composition in the solid state. Thus it is not desirable from a time standpoint to have an excessive amount of intermediate material present. The quantities of niobium can be controlled by varying the thickness of the niobium foil or the thickness of the niobium layer deposited. Successful results are obtained within the range of 0.0001 to 0.002 inch thick niobium layer. It is believed that an optimum range of thickness of the niobium intermediate layer lies between 0.0003 and 0.0005 inch for lap type joints, and 0.0001 and 0.0004 inch for tee joints as found in honeycomb. Once again, however, it should be emphasized that there is no theoretical limit to the thickness of the niobium intermediate layer; the only limitations being those of surface smoothness and the time required to achieve the aforegoing solid state diffusion that has been previously described.

Turning now to the utilization of titanium as an intermediate layer to diffusion bonded nickel surfaces, it is pointed out that the nickel titanium phase diagram shown on Page 1,050 of Constitution of Binary Alloys, Max Hansen, McGraw-Hill Book Co., Inc., 1958, contains several eutectic reactions. It was felt that satisfactory joints could be obtained utilizing a high titanium content eutectic that forms at 955° C. However, it was found that poor quality joints were formed at any temperature below the next highest eutectic, which is approximately 1,110° C. It was found that in order to achieve a good joint, one must exceed the temperature of the second eutectic point. As with niobium, the exact temperature required will vary depending upon the alloy content of the nickel base material.

No compositional change occurs in the titanium foil as the temperature is initially increased. However, around 780° to 800° C solid state diffusion begins. With further temperature increases the solid state diffusion increases at least near the interface between the titanium and nickel, changing the composition. Increasing the temperature to the range of 1,110° to 1,150° C, the joint passes through a liquid plus solid region at a temperature of about 955° C. Diffusion between the titanium and nickel now occurs much more rapidly in the liquid. Therefore, the joint quickly reaches the eutectic liquid composition. At this time the eutectic liquid is free to wet, flow, and form fillets in much the same manner as a brazing alloy. The molten metal quickly picks up additional nickel and again forms a liquid plus solid region at a temperature of about 975° C. The above all happens almost instantaneously at the 975° temperature as it is passed while raising the joint to the desired temperature.

The aforegoing area of the liquid plus solid region is composed of 35 weight percent nickel and 65 weight percent titanium. Continued raising of the temperature to a level of, for example, 1,150° C, causes the joint to solidify only briefly at the inter-metallic TiNi region which is from 54 to 58 weight percent nickel. The second eutectic liquid then is encountered with increased time of heating at the 1,150° C temperature. This eutectic is comprised of 65 weight percent nickel and 35 weight percent titanium. At this time, better flow and filleting takes place. Subsequent diffusion results in a final joint with less than 20 weight percent titanium. The joints formed in this manner at 1,150° C have been found to be superior to those that have been held, for example, at 975° C, the temperature of the lowest melting eutectic.

The thickness of the titanium foil or layer that has been deposited can vary from 0.0001 inch up to 0.0015 inch. The exact quantity will depend to a degree upon the joint configuration one is trying to achieve. As indicated with the niobium material, one does not generally want to utilize too thick an intermediate layer, since the required time for solid state diffusion increases so significantly with the increase in thickness of the layer. However, there is once again no theoretical limit to the thickness of the layer if one wants to heat for an extended period of time.

As indicated, the final joint composition can contain less than 20 weight percent titanium. If one wants to heat for extended periods of time, successful joints can be obtained with as little as 1 weight percent titanium present. Between 10 and 20 weight percent titanium, the joint is comprised of $TiNi_3$ and a solid solution of titanium in nickel. Below 10 weight percent, the joint is comprised of a solid solution of titanium in nickel of the nickel base alloy. The temperature range of heating, as indicated, can vary considerably depending upon the base alloy utilized. However, the temperature should exceed the second eutectic at 1,110° C and can be considerably higher as long as the base nickel alloy does not melt. There is little reason to use higher temperatures unless very short diffusion times are desired, since generally sufficient results can be achieved at a temperature of around 1,135° to 1,180° C.

The aforegoing discussion relative to the invention has referred to keeping the temperature of the intermediate layer at at least a eutectic temperature. Specific temperatures were given to indicate where such eutectics occur. However, it is to be noted that the final step of the herein method involves a solid state diffusion in the intermediate layer wherein the amount of either the niobium or titanium in the layer decreasing with time due to such diffusion. Since this last step is a solid state diffusion, it should be apparent that the intermediate layer need not be kept at the initial eutectic temperature during this step. One can achieve such solid state diffusion at lower temperatures and in some instances it might be desirable to do this. The main penalty to be paid for lowering the temperature for the final state diffusion is that the time of such diffusion will increase significantly. Thus it should be clear that it is not at all mandatory for the intermediate layer to be continually kept in the initial eutectic temperature once the final solid state diffusion begins.

Table I discloses various nickel base materials that have been successfully bonded in accord with the method disclosed in the herein invention. As can be seen, the table represents a broad spectrum of nickel base alloys varying in nickel content from a low of 47 weight percent up to pure nickel. In addition to joining components of the same nickel or nickel base alloy to each other, different nickel base alloys have been joined to one another, utilizing either the titanium or niobium intermediate layer.

TABLE I.—APPROXIMATE CHEMICAL COMPOSITION

| Alloy | Percent | | | | | | |
|---|---|---|---|---|---|---|---|
| | Ni | Cr | Co | Mo | Ti | Al | Others |
| Ni | 99.9 | | | | | | |
| Nichrome V-Cb | 80 | 20 | | | | | 2 Cb (Nb) |
| Inconel 713 | 74.4 | 12.5 | | 4.2 | 0.8 | 6.1 | 2 Cb (Nb) |
| Rene' 41 | 55.2 | 19 | 11 | 10 | 3.1 | 1.4 | |
| Udimet 700 | 52.5 | 15 | 18.5 | 5.2 | 3.5 | 4.25 | 1 Fe |
| Inconel 700 | 47 | 15 | 28.5 | 3.7 | 2.2 | 3.0 | 0.7 Fe |

Table II indicates temperatures that have been successfully utilized to join various materials as set forth in Table I to each other. The following table reflects both joining similar metals to each other as well as dissimilar alloys. It is believed also that the table reflects the most desirably eutectic temperature for obtaining the results of this invention. The table also reflects the dependence of the eutectic temperature upon the nickel base material being joined.

The specimen configurations of the materials joined in the following table have varied from single lap, shear specimens, lap type diffusion couples, honeycomb panel structures, and shapes of nickel base alloy to a porous screen cover. This later mentioned screen was comprised of Nichrome V-Cb wires which had been woven and sintered to form a screen.

The quantity of the intermediate required varies depending upon the form of material being joined. For example, it requires more intermediate to form a lap joint than it does a honeycomb joint. With the larger surface area of a screen to be wet, these joints require still larger quantities of intermediate. Through simple experimental procedure, one can easily determine the optimum amount of intermediate material to be used for a given application. Previously there has been set forth what is believed to be the minimum requirements in order to achieve good results. These can be easily used as guidelines.

TABLE II

ALLOYS JOINED BY THIN-FILM DIFFUSION BRAZING WITH Ti AND Nb

| | JOINING TEMPERATURE | |
|---|---|---|
| | Ti | Nb |
| Ni - Ni | 1125C | 1220C |
| Rene 41 - Rene 41 | 1180C | 1205C |
| Udimet 700 - Udimet 700 | 1135C | 1180C |
| Inconel 713 to Nichrome V-Cb | 1135C | 1205C |
| Inconel 700 to Nichrome V-Cb | 1135C | 1205C |
| Rene 41 to Nichrome V-Cb | 1180C | 1180C |

Most of the brazing was done with the use of protective atmospheres, such as a high purity argon or a vacuum of $10^{-4}$ torr. It is preferred that any protective atmosphere be utilized which would prevent contamination of the niobium or titanium foils.

It is believed the invention will be further understood from the following detailed examples:

EXAMPLE I

A small section of Rene' 41 honeycomb panel was joined using a 0.0005 inch thick niobium foil. The honeycomb was of 0.0015 inch thick Rene' 41 foil. Brazing parameters were 1,200° C for 5 minutes at the time of this experiment.

EXAMPLE II

An optimized joint was formed between Inconel 713 alloy and Nichrome V-Cb screen using a 0.0004 inch thick niobium foil. The brazing conditions were 1,205° C for 2 minutes to form the eutectic liquid and braze the parts, and 1,175° C for 2 hours to diffuse the niobium into the nickel alloys. The microstructure showed that the joint had virtually disappeared. This joining procedure represents a joint made by combining diffusion cycles with solution heat treating cycles and optimized intermediate quantity.

EXAMPLE III

Udimet 700 parts were brazed using a 0.0003 inch thick foil of titanium. The brazing conditions were 1,135° C for 20 minutes. An electron microprobe trace across the joint indicated that the maximum titanium content within the joint was 11 weight percent. This joint could be improved somewhat by using slightly less titanium or by using an extended diffusion treatment.

For a given base material, one should investigate both the titanium and niobium to determine which will be superior. With some materials, one of the intermediates will appear to have a much better wetting and flow and form a more ductile joint than the other. Whereas the niobium intermediate usually has the higher reaction temperature with the base alloy, occasionally, as in the case of joining Rene' 41 to Nichrome V-Cb, the temperatures are the same and niobium forms the superior joint. In other cases, the lower temperature of the titanium intermediate reaction may be desirable in order to avoid incipient melting or in order to keep the diffusion treating temperature low so as not to dissolve certain of the carbides found in the base alloy. Thus, the final selection of the intermediate material will depend somewhat on the joint configuration, the amount of wetting and flow, the ductility of the final joint, the reaction temperature of the intermediate for that particular base alloy, and the heat treatment which is desirable for that alloy.

I claim:

1. A method of joining nickel members comprising:
    disposing a thin film of a metal selected from the class consisting of niobium and titanium between the mating surfaces of the nickel members to be joined,
    placing the mating surfaces of the members together, wherein said metal film forms an intermediate layer,
    heating said intermediate layer to at least a eutectic temperature, such that for titanium a second eutectic point is exceeded, and holding said surfaces at said eutectic temperatures for a period of time sufficient to allow solid state diffusion of nickel into said layer, formation of a liquid in said layer, and a return to a solid state diffusion between said layer and said nickel to join said members.

2. The method of claim 1 wherein said thin film is niobium.

3. The method of claim 2 wherein said intermediate layer is heated to at least 1,175° C.

4. The method of claim 2 wherein the surfaces are held at the final diffusion temperature until the intermediate layer contains less than 30 weight percent niobium.

5. The method of claim 4 wherein the final composition of the intermediate layer contains less than 10 weight percent niobium.

6. The method of claim 2 wherein the thickness of said film of niobium can vary from 0.0001 to 0.002 inch.

7. The method of claim 1 wherein the thin film is titanium and the surfaces are held at the final diffusion temperature until the intermediate layer contains less than 10 weight percent titanium.

8. The method of claim 7 wherein the thickness of said thin film of titanium can vary from 0.0001 to 0.0015 inch.

* * * * *